April 7, 1953     A. E. ZABEL     2,634,138
HINGED AUTOMOBILE FENDER
Filed April 21, 1950     2 SHEETS—SHEET 1
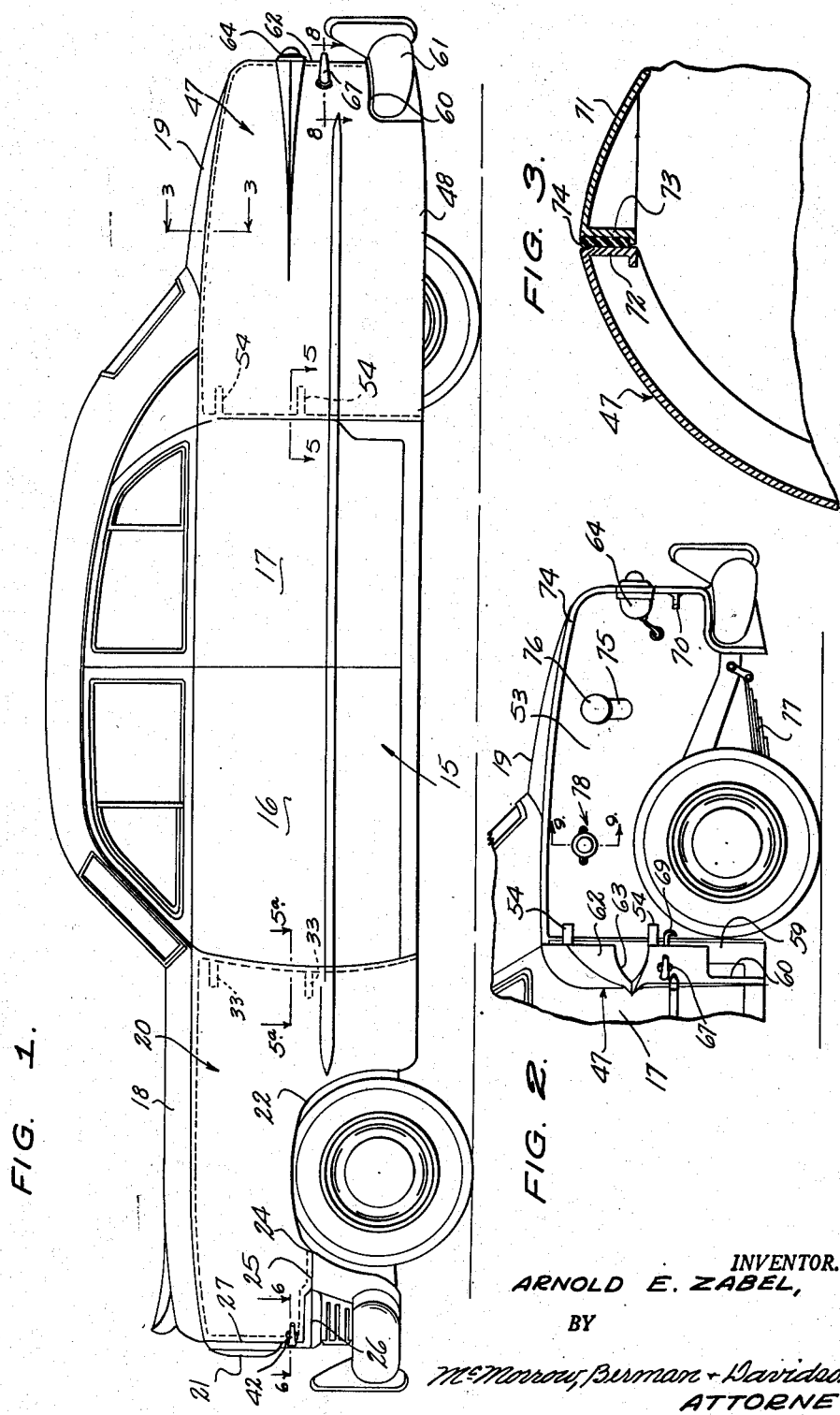
INVENTOR.
ARNOLD E. ZABEL,
BY
McMorrow, Berman + Davidson
ATTORNEYS.

April 7, 1953
A. E. ZABEL
2,634,138
HINGED AUTOMOBILE FENDER
Filed April 21, 1950
2 SHEETS—SHEET 2
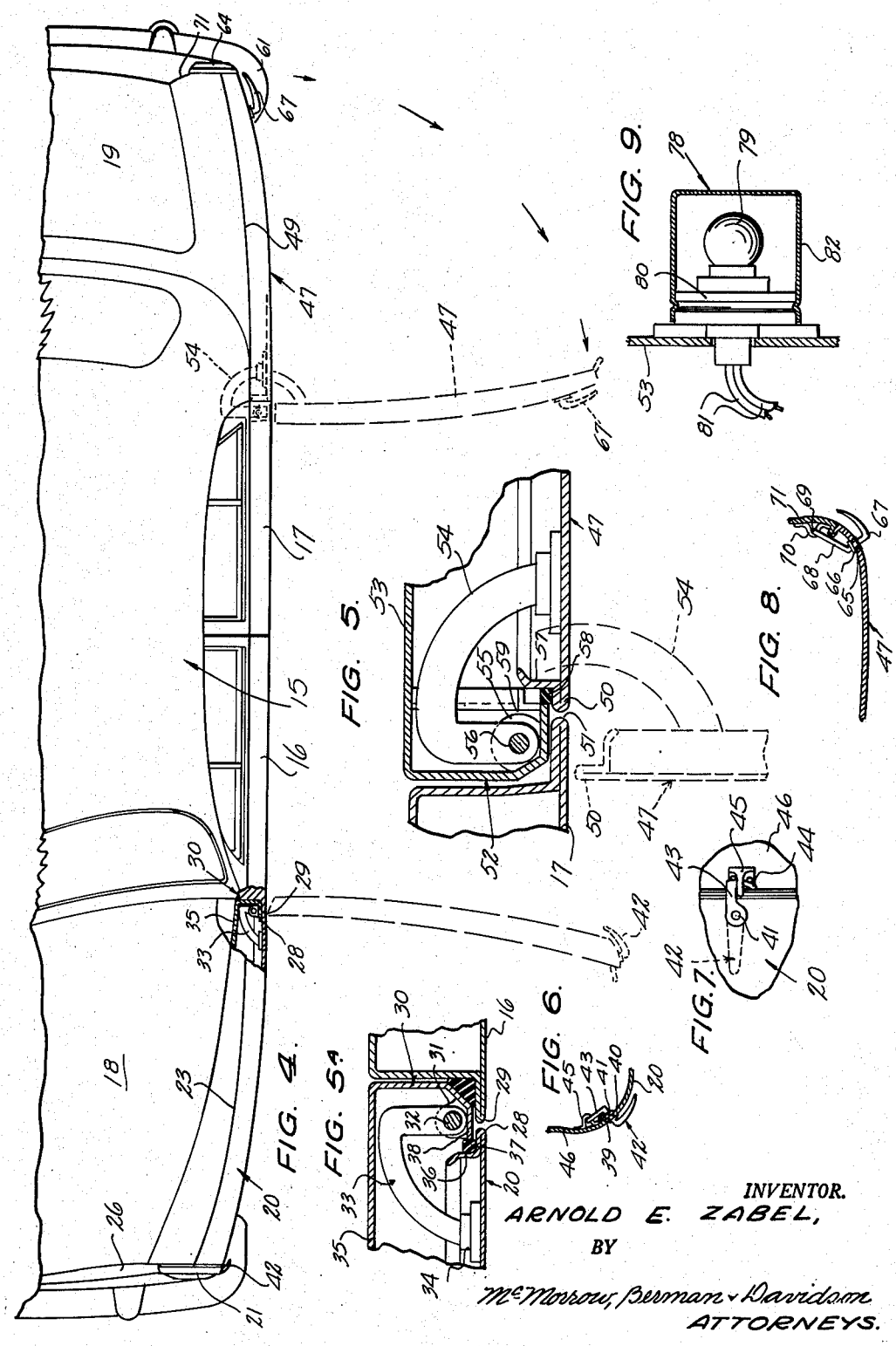
INVENTOR.
ARNOLD E. ZABEL,
BY
McMorrow, Berman & Davidson
ATTORNEYS.

Patented Apr. 7, 1953

2,634,138

UNITED STATES PATENT OFFICE 2,634,138

HINGED AUTOMOBILE FENDER

Arnold E. Zabel, Bremerton, Wash.

Application April 21, 1950, Serial No. 157,365

2 Claims. (Cl. 280—153)

My invention relates to improvements in hinged automobile fenders.

In many modern makes of automobiles it is extremely difficult to change tires, apply skid chains, and the like, because of the large, one-piece, streamlined, skirted fenders which substantially completely encase the wheels of the automobiles, so that the wheels and surrounding mechanism are quite inaccessible. Accordingly, it is a primary object of my invention to provide hinged fenders for automobiles which will make the wheels and surrounding mechanism readily accessible.

A further object is to provide a unitary or one-piece hinged fender which is highly simplified, compact, neat and attractive in appearance, the fenders having concealed hinges, and being relatively inexpensive to make.

A further object is to provide a hinged fender for automobiles which will add to the attractiveness of the automobile body and its streamlining by eliminating the necessity for the well known separate, removable, side fender panels, presently included in many automobile fenders, to facilitate changing tires, applying skid chains, and the like.

Still further objects of the invention are to provide a hinged fender which may be swung open throughout its entire length for rendering all of the adjacent mechanism on the side of the automobile under the fender readily accessible, the use of the fender making it possible to completely conceal the gas tank cover without the use of any separate, removable or hinged closure member.

Other objects and advantages of the invention will be apparent during the course of the following description.

In the accompanying drawings forming a part of this application, and in which like numerals are employed to designate like parts throughout the same:

Figure 1 is a side elevational view of an automobile equipped with hinged fenders embodying my invention;

Figure 2 is a fragmentary side elevational view of the rear portion of the automobile and showing the rear hinged fender in an open position;

Figure 3 is a greatly enlarged, fragmentary, transverse, vertical section taken on line 3—3 of Figure 1;

Figure 4 is a fragmentary plan view of the automobile shown in Figure 1, my hinged fenders being shown in open position in broken lines;

Figure 5 is an enlarged, fragmentary, horizontal section taken on line 5—5 of Figure 1;

Figure 5a is an enlarged, fragmentary, horizontal, sectional view taken on line 5a—5a of Figure 1;

Figure 6 is a similar sectional view taken on line 6—6 of Figure 1;

Figure 7 is a fragmentary, side elevational view of latch mechanism illustrated in Figure 6;

Figure 8 is a fragmentary, horizontal, sectional view taken on line 8—8 of Figure 1; and Figure 9 is an enlarged, fragmentary, vertical, sectional view taken on line 9—9 of Figure 2.

In the drawings, where, for the purpose of illustration, is shown a preferred embodiment of my invention, the numeral 15 designates generally a modern type of automobile equipped with hinged fenders embodying my invention. The automobile illustrated is a four-door sedan having pairs of front and rear doors 16 and 17, the usual hood 18 and a rear trunk compartment 19. The front hinged fenders 20 extend from the forward edges of the front doors 16 to the headlights 21, and the top horizontal edges of the fenders 20 are disposed at elevations slightly below the top of the hood 18, as shown. At their rear ends, the front fenders 15 extend substantially vertically for the entire height of the front doors 16 at the forward edges of the front doors. Each front fender 20 is provided in its bottom edge with the usual arcuate wheel-access opening 22, and each front fender is split or separated vertically along a longitudinal, slightly curved line 23 at the top of the fender, and extending for the entire length of the fender from the adjacent headlight 21 to its rear end. Each hinged front fender 20 is likewise split or separated horizontally from a point near the top of the wheel-access opening 22 and at the forward edge of such opening, as shown at 24, along a substantially horizontal line 25, which extends adjacent to the top of the usual radiator grille 26. The forward end 27 of each hinged fender 20 is substantially vertical, and each fender is formed or contoured to fit around substantially the outer half of the adjacent headlight 21.

Each hinged front fender 20 has its rear, generally vertical edge 28 arranged adjacent to the front, generally vertical edge 29 of the adjacent front door 16. The usual substantially vertical, front door post or body frame member 30 is provided, and each front door 16 is hingedly secured to the adjacent post 30 in the usual manner. Each door post 30 is provided with vertically spaced, aligned, apertured lugs 31 receiving therein removable, vertical hinge pins 32, upon which are mounted for free, horizontal, swinging movement, generally U-shaped, curved hinge bars or members 33. The forward ends of the hinge bars 33 extend longitudinally forwardly of the adjacent door post 30, and are suitably rigidly secured to the inner side of the hinged fender 20, as at 34. The arrangement is such that the vertically spaced hinge bars 33 are enclosed by the door post 30 and fender 20 when the fender is in the closed or normal position. The hinge bars 33 are enclosed at their inner sides by a substantially vertical, longitudinal body panel 35 which extends adjacent to the side of the engine and may be integrally secured at its rear end to the adjacent door post 30, as shown. Each hinged fender 20 is provided at its rear end with a substantially vertical, laterally inwardly projecting flange 36 integral therewith, and this flange 36 preferably carries an elongated, substantially vertical cushion strip or gasket 37 formed of rubber or some other suitable compressible material. When the fender 20 is closed or in its normal position, the compressible strip 37 engages the forward edge or flange 38 of the door post 30. The entire fender 20 is swingable horizontally upon the removable hinge pins 32 to the open and closed positions shown in Figure 4. It should be noted that when the fenders 20 are closed or in their normal positions, the hinge bars 33 and associated elements are completely concealed from view, and only the substantially vertical parting lines 23 and 25, as well as the parting line between the edges 28 and 29, are visible.

Each fender 20 extends laterally inwardly beneath the adjacent headlight 21 for a slight distance, as shown at 39, Figure 6, and each fender is provided in its forward end and below the adjacent headlight with an opening 40 rotatably receiving therein the central portion or shank 41 of a curved latch handle 42, which extends adjacent to the outer face of the fender 20 just above the grille 26. A transverse latch extension or arm 43 is integrally secured to the inner end of the shank 41, and provided at its free end with a short, depending hook or extension 44 for engagement through a latch eye 45, in turn rigidly mounted upon the inner face of a front panel 46 to which the grille 26 is secured. The latch handle 42 is vertically swingable from the outer side of the fender 20 for disengaging the depending hook 44 from the eye 45, in order to release the hinged fender so that it may be swung open. When the fender 20 is closed, the handle 42 is elevated for engaging the hook 44 in the eye 45. This securely locks the fender in its normally closed position.

The automobile 15 is likewise equipped with rear hinged fenders 47, which are formed in one piece or unitary, and which extend from the rear vertical edges of the rear doors 17 to points adjacent the rear end of the trunk 19. The rear fenders 47 may have their bottom, horizontal edges 48 extending well over the rear wheels of the automobile for providing the maximum wheel coverage, yet affording ready access to the rear wheels and associated mechanism when in the open positions.

Each rear fender 47 is split or separated at its top along a substantially horizontal, slightly curved, longitudinal line 49, and the forward vertical edge 50 of each rear fender lies adjacent to the rear vertical edge 51 of the adjacent rear door 17. Each rear door 17 is hingedly mounted upon a rear, substantially vertical door post or frame member 52 integrally secured at its inner side to a substantially vertical, longitudinal, side body panel 53, forming the sides of the trunk compartment 19. Each hinged fender 47 is spaced laterally outwardly from the adjacent panel 53 and hingedly connected with the adjacent door post 52 by means of generally U-shaped, curved hinge bars or members 54 substantially identical to the hinge bars 33. The forward ends of the hinge bars 54 are pivotally connected with vertically spaced, apertured lugs 55 by means of removable, vertical hinge pins 56, and the lugs 55 are suitably rigidly secured to the outer sides of the door post 52, Figure 5. Each hinged fender 47 is provided at its forward end with an elongated, vertical, laterally inwardly projecting flange 57 integral therewith, and each flange 57 carries an elongated, vertical, compressible strip or gasket 58 of rubber or the like which abuts the outer flange or side 59 of the door post 52 when the fender 47 is in the closed position. The arrangement is such that when the rear hinged fenders 47 are in their normally closed positions, the curved hinge bars 54 and associated elements are completely concealed from view.

Each hinged fender 47 is recessed or notched in its rear end and bottom edge 48, as at 60, so that the fender may clear the adjacent curled-around ends 61 of the rear bumper of the automobile. The rear end 62 of each fender 47 is further recessed or notched, as at 63, so that the fender may fit around the adjacent taillight 64.

Each rear fender is provided near its rear end and in its outer side and below the adjacent taillight 64 with an opening 65 within which is rotatably mounted a short shank or shaft 66 of a latch handle 67 which extends horizontally adjacent to the outer face of the rear fender, and which may be curved longitudinally to conform to the contour of the fender, Figure 8. Integrally secured to the inner end of the shank 66 is a curved, horizontal latch arm or extension 68 provided at its rear end with a depending hook 69 integral therewith for engagement in a loop or eye 70, in turn rigidly secured to the inner face of a rear, substantially vertical panel 71 arranged between the adjacent rear fender 47 and trunk lid 19. The handle 67 is swingable vertically for latching and unlatching the rear hinged fender 47, so that it may be swung to and from its open and closed positions, shown in Figure 4.

As shown in Figure 3, each hinged fender 47 is provided at its inner side and marginal edge with a narrow, flat, inturned, vertical flange 72 integral therewith, and this flange is continuous and extends entirely about the top and rear end of the fender 47. A companion or mating vertical flange 73 is integrally secured to the top of the trunk 19 and rear panel 71, and a compressible gasket or seal 47 of rubber or the like may be permanently secured to the flange 73 and extending throughout its entire length. When the fender 74 is closed, the flange 72 abuts the gasket 74, so that the fender will be rattle-proof. A similar compressible gasket, not shown, is provided between each front fender 20 and the body of the automobile, so that the front fenders are likewise rattle-proof.

As best shown in Figure 2, a gas tank inlet pipe 75 extends through the adjacent side panel 53 and has its cap or cover 76 disposed inwardly of and concealed by the adjacent fender 47 when such fender is closed. When the rear hinged fender 47 is open, as shown dotted in Figure 4, the cover 76 is exposed, as are the adjacent rear wheel of the automobile, rear spring 77, taillight 64, and other adjacent mechanism which is usually inaccessible due to the design of most conventonal rear fenders. When the hinged fender 47 is open, it is very easy to change the adjacent rear tire or wheel, or to apply skid chains, or the like, or to place a lifting jack beneath the spring 77.

In order to illuminate the space inwardly of each rear fender 47 when the same is open, I mount a small light 78 on each side panel 53 above the adjacent rear wheel of the automobile, Figure 2. Each light 78 comprises a light bulb 79 mounted in a suitable socket or base 80, in turn rigidly secured to the adjacent panel 53. The wires 81 leading from the light bulb 79 are spliced into the wires leading to the taillights 64, the small lights 78 in no way affecting the normal operation of the electrical circuit of the automobile. So that mud from the rear wheels will not cover the light bulb 79, I provide the base 80 with a removable sheet metal cover or cap 82.

As shown clearly in Figure 1, the rear hinged fenders 47 are unitary or formed in one piece, and it is unnecessary to provide the usual removable fender sections adjacent to the rear wheels for providing access to the wheels when changing a tire or the like. As previously stated, when the rear fenders 47 are swung open, the rear wheels and surrounding mechanism are fully accessible. Since the hinges of the front and rear fenders are completely concealed when the fenders are closed, and since the hinged fenders are unitary, they lend themselves to the maximum streamlining of the automobile body, and are extremely neat and attractive in appearance. Further, since the hinge pins 32 and 56 are readily removable, the front and rear fenders 28 and 47 may be readily bodily removed from the automobile for repairing them, and the like. The arrangement greatly facilitates the repairing of the automobile, and the construction of the hinged fenders is highly simplified, economical and sturdy.

It is to be understood that the form of my invention herewith shown and described is to be taken as a preferred example of the same, and that various changes in shape, size and arrangement of parts may be resorted to without departing from the spirit of the invention or the scope of the subjoined claims.

Having thus described my invention, I claim:

1. In combination, an automobile body having a hollow vertical door post open at one side thereof, said post including a flange at the outboard side thereof, said flange having a free edge forming a side of the opening, vertical axis hinge pin means mounted within the interior of the hollow post, said pin means being spaced inboardly from said flange, a fender having a rear vertical edge located close to and normally extending vertically along the outboard side of said post flange in the closed position of the fender, said fender having a fender flange extending longitudinally along and spaced laterally inwardly from said one fender edge in a position to engage the free edge of the post flange in the closed position of the fender, and arcuate arm means secured at one end to the inboard side of the fender at a point spaced laterally inwardly from said fender flange, said arm means extending across the separation between the fender and the door post and having its other end pivoted on said pin means behind the post flange whereby said arm means are concealed behind the post flange and the fender in the closed position of the fender.

2. In combination, an automobile body having a hollow vertical door post open at one side thereof, said post including a flange at the outboard side thereof, said flange having a free edge forming a side of the opening, vertical axis hinge pin means mounted within the interior of the hollow post, said pin means being spaced inboardly from said flange, a fender having a rear vertical edge located close to and normally extending vertically along the outboard side of said post flange in the closed position of the fender, said fender having a fender flange extending longitudinally along and spaced laterally inwardly from said one fender edge in a position to engage the free edge of the post flange in the closed position of the fender, and arcuate arm means secured at one end to the inboard side of the fender at a point spaced laterally inwardly from said fender flange, said arm means extending across the separation between the fender and the door post and having its other end pivoted on said pin means behind the post flange whereby said arm means are concealed behind the post flange and the fender in the closed position of the fender, the said one edge of the fender and a portion of the fender lying between said one edge and said fender flange being arranged to overlie said post flange in the closed position of the fender.

ARNOLD E. ZABEL.

REFERENCES CITED

The following references are of record in the file of this patent:

UNITED STATES PATENTS

| Number | Name | Date |
|---|---|---|
| D. 96,860 | Ryan | Sept. 10, 1935 |
| 2,157,793 | Lang | May 9, 1939 |
| 2,365,792 | Wohlfield | Dec. 26, 1944 |
| 2,379,341 | Craig | June 26, 1945 |
| 2,383,428 | Ulrich | Aug. 21, 1945 |
| 2,491,791 | Allen | Dec. 20, 1949 |
| 2,491,800 | Colaner | Dec. 20, 1949 |